Patented Mar. 10, 1936

2,033,370

UNITED STATES PATENT OFFICE 2,033,370

NITRATION OF DIPHENYL

John L. Ballard and Russell L. Jenkins, Anniston, Ala., assignors to Swann Research, Incorporated, a corporation of Alabama No Drawing. Application October 13, 1934,
Serial No. 748,220

10 Claims. (Cl. 260—142)

This invention relates to a method for the production of nitrodiphenyl. It has for one of its objects the provision of a process for the economical production of nitrodiphenyl. A further object is the provision of a process by which a higher yield of the para isomer of mononitrodiphenyl may be obtained.

In previous work on the nitration of diphenyl it has been proposed to form the mononitro derivatives by first suspending the powdered diphenyl in weak nitric and sulfuric acids and then adding a mixture of concentrated nitric and sulfuric acids. This method gave a ratio of isomers in the neighborhood of 1.46, which ratio is expressed as the ratio of the para to the ortho isomer.

For many purposes the paranitrodiphenyl is to be preferred to the ortho isomer, and considerable experimental work has been done with the end in view of obtaining better yields of this isomer.

As a result of this experimental work, we have found that if molten diphenyl be intimately mixed with an alkali metal nitrate and sulfuric acid be added to the mixture, the diphenyl is readily nitrated and a good yield of the para isomer is obtained.

Several examples will serve to illustrate our method.

Example 1

Mix together 80 pounds of molten diphenyl and 46.94 pounds of sodium nitrate and then add concentrated sulfuric acid to the mixture at such a rate with stirring that the temperature is maintained in the neighborhood of 100° C. The sulfuric acid is proportioned to the sodium nitrate used, which in this case is equivalent to 105% of the theory. At the end of the acid addition the mass is stirred for an hour or two longer, after which the nitrated product is removed from the acid-salt layer by decantation. The crude material is then brought to a boil with water and any residual acid is neutralized. The washed material is then separated from the aqueous solution and dried. A separation of the isomers may now be made by distillation. The net yield of crude nitros based on diphenyl nitrated will be in excess of 95%, and the ratio of isomers expressed as the ratio of the para to the ortho will be between 1.60 and 1.78. Approximately 88% of the diphenyl was consumed in the reaction.

Example 2

By means of a two-step nitration process we are enabled to obtain a better yield of nitrodiphenyls. We do this by making the first nitration with somewhat less than 100% equivalent sodium nitrate, then removing the nitros together with the unnitrated diphenyl from the acid-salt mixture and subject the mixture to a further nitration. The principle will be evident from the following detailed description:

Mix together 80 pounds of molten diphenyl and 13.44 pounds of sodium nitrate equivalent to 75% of the theoretical amount necessary for complete nitration. To the mixture 40.7 pounds of sulfuric acid is added, as in Example 1, and the temperature maintained between 95° and 100° throughthe nitration period. This period is about 10 to 11 hours in length at this temperature. After the acid addition has been completed and a further period allowed for completion of the reaction, the crude nitros are removed by decantation and then subjected to the action of a second nitrating mixture.

The second nitrating mixture consists of 13.44 pounds of sodium nitrate and 16.21 pounds of sulfuric acid, both of which are equivalent to 30% of the theory based upon the diphenyl originally used. The reaction of the second step is carried out as in the first step, the time consumed being approximately 6 hours at 95° to 100° C. Upon completion of the reaction the mixed nitros are again separated from the acid-salt layer and purified as above described.

The results showed that 90.5% of the original diphenyl was consumed in the process and 99.8% of the diphenyl consumed was recovered as the mixed nitros.

The ratio of isomers, expressed as the ratio of the para to the ortho, will be between 1.60 and 1.78.

In general either the sodium or potassium nitrate may be used for the present process, preference, however, being given to the cheaper sodium salt. The grade used in the above experiments analyzed 98.9% $NaNO_3$. For the present process the excess of sodium nitrate used over the theory may be taken as not greater than 15%.

The quantity of sulfuric acid employed is equivalent to the sodium nitrate used and need not be supplied in excess. The commercial 66° Bé. acid is suitable, although the concentration may be varied somewhat.

The temperature of reaction is maintained above the melting point of diphenyl and preferably in the neighborhood of 95° to 100° C. At higher temperatures, up to 130° C., the reaction will proceed faster; however, some loss of nitric acid will take place. Temperatures much above 130° C. are not recommended for this reaction.

Having now particularly described our invention, it will be apparent that it is susceptible to various changes and modification without departing from the spirit thereof, and we desire that it be not limited except as indicated by the prior art or as specifically set forth in the appended claims.

What we claim is:

1. The method of nitrating diphenyl which comprises mixing molten diphenyl with a alkali metal nitrate and then treating the mixture with sulfuric acid.

2. The method of nitrating diphenyl which comprises mixing molten diphenyl with sodium nitrate and then treating the mixture with an amount of sulfuric acid substantially equivalent to the nitrate used.

3. The method of nitrating diphenyl which comprises mixing molten diphenyl with sodium nitrate and then treating the mixture with sulfuric acid, the later being used in proportions substantially equivalent to the nitrate, and the nitrate being used in proportions ranging between the theoretical and 15% excess.

4. The method of mononitrating diphenyl which comprises mixing molten diphenyl with sodium nitrate and then treating the mixture with sulfuric acid while at a temperature below 130° C.

5. The method of mononitrating diphenyl which comprises mixing molten diphenyl with sodium nitrate and then treating the mixture with sulfuric acid at a temperature between 95° and 100° C.

6. The method of mononitrating diphenyl which comprises mixing molten diphenyl with sodium nitrate and then treating the mixture with substantially an equivalent amount of sulfuric acid at the nitrating temperature, the proportion of sodium nitrate used being substantially less than that theoretically required, recovering the mixture of nitrodiphenyl and diphenyl from the reaction product, and nitrating the unreacted diphenyl present in the mixture with an additional supply of sodium nitrate and sulfuric acid.

7. The method of producing mixed ortho and para nitro isomers of diphenyl which comprises mixing molten diphenyl with sodium nitrate and adding thereto strong sulfuric acid at such a rate as to maintain the temperature of the reacting mixture in the neighborhood of 100° C.

8. The method of producing a mixture of ortho and para nitrodiphenyl, which comprises mixing molten diphenyl with sodium nitrate in slight excess and adding thereto an equivalent amount, based on the nitrate, of strong sulfuric acid.

9. The method of producing a mixture of ortho and para nitrodiphenyl, which comprises mixing molten diphenyl with sodium nitrate in slight excess and maintaining the mixture at reaction temperature by the addition of strong sulfuric acid thereto.

10. The method of producing a mixture of ortho and para nitrodiphenyls comprising mixing molten diphenyl and sodium nitrate, the latter being in slight excess, and maintaining the mixture at a temperature of approximately 100° C. by the addition of strong sulfuric acid thereto.

JOHN L. BALLARD.
RUSSELL L. JENKINS.